[54] METHOD AND DEVICE FOR THREE-DIMENSIONAL VISUALIZATION FROM VIDEO SIGNALS, NOTABLY FOR ELECTRON MICROSCOPY

[75] Inventors: Alain R. P. Marraud, Villebon S. Yvette; Maurice G. Q. Bonnet, Puteaux, both of France

[73] Assignee: Centre National de la Recherche Scientifique, France

[21] Appl. No.: 339,174

[22] Filed: Jan. 13, 1982

[30] Foreign Application Priority Data

Jan. 16, 1981 [FR] France .................................. 81 00758

[51] Int. Cl.³ .............................................. H04N 9/54
[52] U.S. Cl. ..................................................... 358/88
[58] Field of Search ........................... 358/88, 91, 92, 3

[56] References Cited

U.S. PATENT DOCUMENTS

| 2,756,363 | 7/1956 | Wright | 358/91 |
| 3,334,179 | 8/1967 | Winnek | 358/92 |
| 3,585,382 | 6/1971 | Suganuma | 358/92 |
| 3,878,329 | 4/1975 | Brown | 358/88 |
| 4,160,973 | 7/1979 | Berlin, Jr. | 358/88 |

FOREIGN PATENT DOCUMENTS

2227956  6/1972  Fed. Rep. of Germany .

*Primary Examiner*—Joseph A. Orsino, Jr.
*Attorney, Agent, or Firm*—Thomas J. Greer, Jr.

[57] ABSTRACT

The present invention relates to a method of three-dimensional visualization of an object and a device therefor. A video camera, equipped with an image numerator takes photographs supplied by an electron microscope, for different angular positions of an object. The images which are numbered thus are applied to a digital image memory. Under the control of a visualization clock, this memory delivers the line of the same range taken successively in each of the base images to an image visualization member. The member reproduces its lines consecutively, and thus forms a composite image which may be used for relief visualization. In order to re-establish the format of the image, an anamorphosis is carried out, for example, by repeating n times on each line of the composite image each of the image points selected in one of the base images. The composite image which is obtained thus is provided with a lenticular grating of sectors of a cylinder.

17 Claims, 2 Drawing Figures

METHOD AND DEVICE FOR THREE-DIMENSIONAL VISUALIZATION FROM VIDEO SIGNALS, NOTABLY FOR ELECTRON MICROSCOPY

BACKGROUND OF THE INVENTION

This invention relates to three-dimensional visualization, more commonly known under the name of relief photography.

Relief photography devices which use lenticular gratings or "chequerings" have already been proposed, particularly, and a long time ago, by Maurice Bonnet. This is a thoroughly perfected technique and it provides impressive results. The photograph may either be taken using special apparatus incorporating a lenticular grating from the time when the photograph is taken (direct method), or by the composition of a series of flat conventional images of the same object, produced at slightly different photographing angles (indirect method). This second method which is very interesting for scientific observation is fairly time consuming, because it almost necessarily involves a specific stage of photographic treatment which is at the same time lengthy, delicate and quite expensive.

However, for a certain number of uses, it would be necessary to rapidly have a composite image at one's disposal, almost in real time. This is notably the case in electron microscopy.

BRIEF SUMMARY OF THE INVENTION

The present invention provides a means which allows the very rapid production of relief images.

To this end, the present invention proposes a method which comprises the following operations:
  (a) the production of n sets of video signals ($S_k$; k varying from 1 to n), respectively corresponding to n base images ($V_k$) of the object, taken with the same field, but at different angles ($A_k$);
  (b) the production of a composite image composed of adjacent regions, each of which is composed of n portions respectively defined from the n sets of video signals by selecting in each set the video signals relating to the region concerned of the composite image, these n portions being in addition arranged in a manner which corresponds to the photographing angles ($A_k$).

At the end of this operation (b), the composite image containing the information necessary for the visualization of the relief has already been provided. The method is completed, immediately or subsequently by another operation:
  (c) arranging in optical cooperation with the composite image thus formed a lenticular grating, in which the configuration of the grating corresponds to the configuration of the regions in the composite image, which the optical characteristics of each elementary lens of the gratings are adapted to the arrangement of the portions forming the region of the composite image which is associated with the elementary lens concerned.

In operation (a), the video signals are advantageously registered in numerical form. At present it is considered that a numbering with at least 16 ($2^4$), preferably from 32 ($2^5$) to 128 ($2^7$) grey levels suffices for most uses.

In a preferred embodiment of the present invention, in operation (a), the n images ($V_k$) of the object are taken according to the angles ($A_k$) defined with respect to a common axis. In operation (b), the regions of the composite image are adjacent bands which are parallel to this common axis, whereas in each of these regions, the image portions are adjacent sections of images which are also parallel to the common axis, and in operation (c), the lenticular grating is a grating of lenses in the form of sectors of cylinders, the generatrices of which are also parallel to the common axis.

This may be produced in practical terms in the following manner: each image section corresponds to a zone taken in the format of the region in one of the base images, while the composite image is produced with a ratio anamorphosis n between the general direction of the image sections and the direction which is perpendicular thereto. Another anamorphosis is usually necessary to take into account the incline of the base images.

Although it is known to cut a video image in any desired manner, it is easier to make a cut parallel to the lines: the video signals are then defined for a scanning line parallel to the common axis, or in the general direction of the bands and the image sections and each image section comprises one or more lines of one of the base images.

In a particular embodiment of the present invention, operation (b) comprises:
  (b1) defining a line number (L) which is initially equal to 1,
  (b2) seeking in the memory the range line (L) of the base image of angle ($A_1$),
  (b3) exciting a line of an image display according to each point of the line (L) of the base image of angle ($A_1$), repeated consecutively n times,
  (b4) selectively repeating the operations (b2) and (b3) for the range line (L) of the other base images in the order of the angles, and
  (b5) repeating the operations (b2) to (b4) after each time having increased to line number (L), up to exhaustion of the lines.

In operation (b), visualization may be affected on a cathoscope, then photographed; the composite image thus directly obtained only has to receive a lenticular grating. Better still, it is possible to use a digital output member which is capable of reproducing the image on a registration support, in particular in the case of digital video signals.

Although the base image may be directly produced in the form of video signals (electronic production of images), it is also possible to take n base images ($V_k$) of the object using a video camera at different angles ($A_k$), and to selectively register the n base images.

The present invention applies in particular to the case of electron microscopes, where the n base images are taken by positioning the object under n different angles.

In practice, the number n of the base images is at least equal to 4, and preferably at least equal to 8. The number of regions (or bands) of the composite image, each comprising n respective portions or sections of the base images is of the order of several hundred and notably depends on the size of the relief image which is to be finally obtained.

The present invention also relates to devices for implementing the above method.

Other characteristics and advantages of this invention will be revealed from reading the following detailed description which refers to the accompanying drawings.

DETAILED DESCRIPTION

The detailed description first and foremost applies within the frame of use of a transmission electron microscope.

Figure 1:
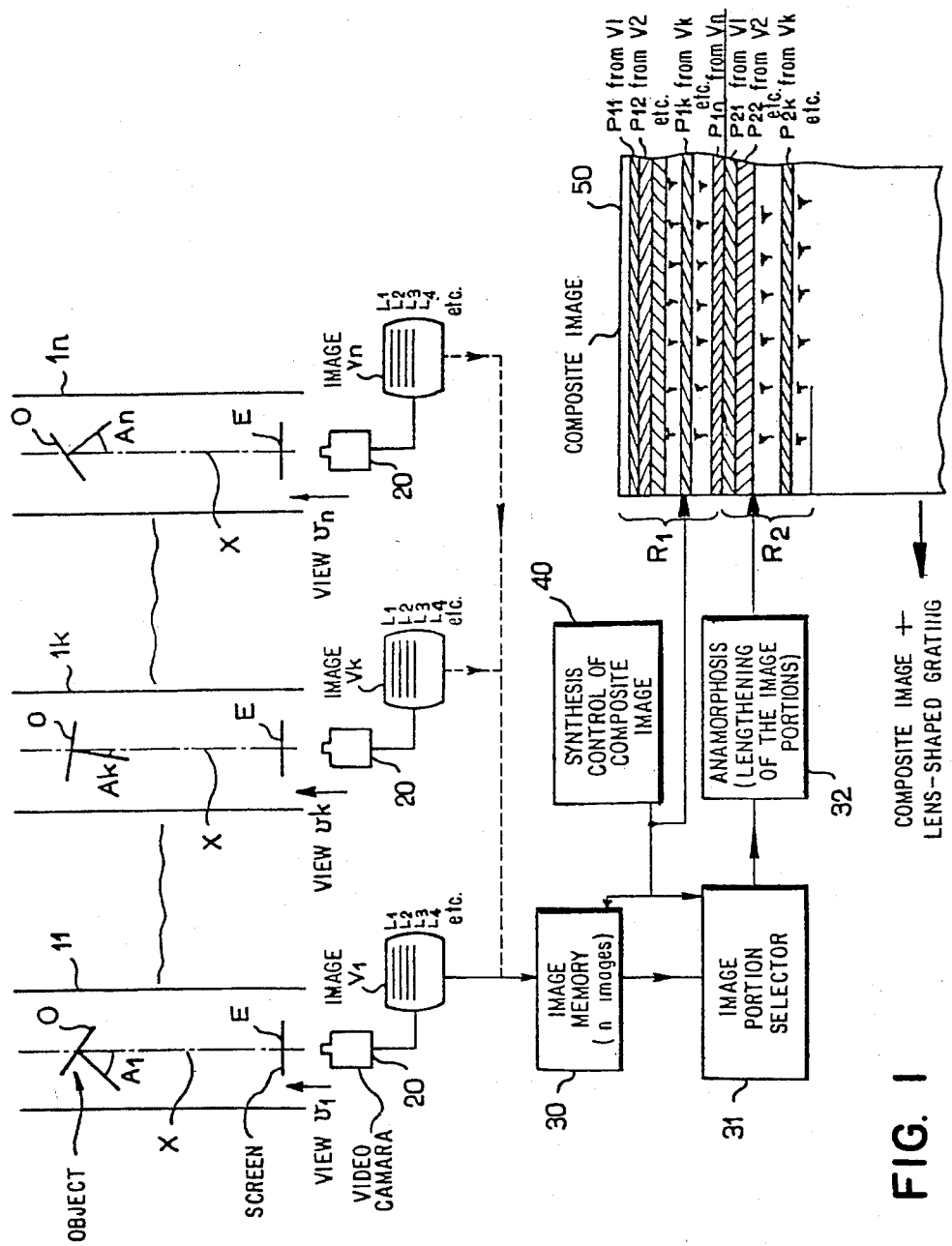
FIG. 1 schematically and generally illustrates the implementation of the method according to the present invention.
Figure 2:
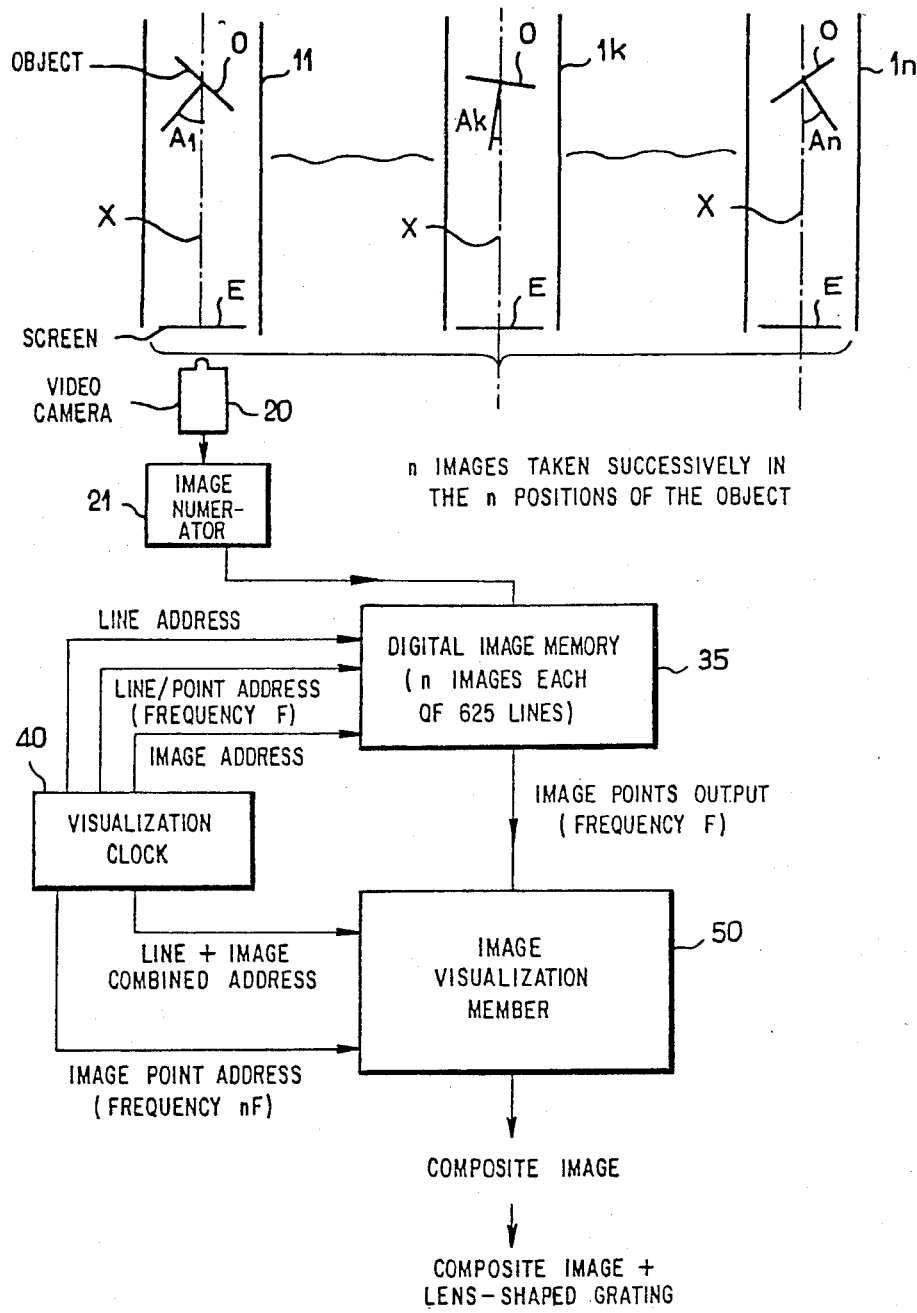
FIG. 2 schematically illustrates a particular implementation of this method.

In FIGS. 1 and 2, the references 1l, 1k and 1n denote the image generator of the same electron microscope, observing an object O, the electron image of which is visualized on a fluorescent screen E. The device is seen in plane section and it illustrates the fact that n electron images of the object are taken successively in accordance with the respective angles $A_k$, with k varying from 1 to n. The photographing angles are considered with respect to a common axis passing through the intersection of the object (or its principal plane) with the "optical" axis X of the electron microscope, this common axis being, moreover, perpendicular to the plane of the figure. In other words, the photographing angle ($A_k$) is the angle between the normal plane to the figure which passes through the optical axis X and a normal plane to the principal plane of the object.

In practice, the angles ($A_k$) are regularly distributed around the optical axis X.

Thus, for the n successive positions of the object, successive views, noted in FIG. 1 as $v_1, \ldots v_k \ldots v_n$ are obtained on the screen E of the electron microscope. A video camera 20 successively photographs each of these views, such as $v_k$, which appears on the screen E. Each time, the camera 20 will be able to provide a corresponding image thereof $V_1 \ldots V_k \ldots V_n$, the number of lines of which is linked to the characteristics of the video camera. For the requirements of the present description, these lines are numbered L1, L2, L3 and L4 etc. In practice, for the visual convenience of the observer, the lines of a television image are frequently interlaced. To simplify the present description, it will be assumed that in this case they are not interlaced, while it is noted that the use of an interlaced image does not basically change the implementation of the present invention. The screens which visualize the images $V_1$ to $V_n$ are used for direct observation by the experimenter, as well as being used as a starting point for the implementation of the present invention with the objective of obtaining a final relief image.

Thus, in the position relative to the view $v_1$, the video signals which are produced by the camera 20 and which correspond to the video image $V_1$, are transmitted to a video image memorizing device 30. The same holds true for all the other views of the object under the different angles, and notably for view $v_k$ with the associated video image $V_k$, and for the view $v_n$, with the associated video image $V_n$. The fact that the camera successively supplies the video signals corresponding to each of the images taken to the image memorizing device 30 is illustrated in dashed lines in FIG. 1, the camera 20 being illustrated in position for each of the photographing angles illustrated.

After the n photographs have thus been taken, the image memorizing device 30 thus comprises n sets of video information, respectively corresponding to n base images $V_k$ of the object, taken using the same field, but under the different angles $A_k$. This makes up operation (a) of the method according to the present invention. However, it will be noted that instead of producing these video signals by an effective photograph, it is possible to produce the signals in another manner, notably using devices known as electronic image generators.

Moreover, FIG. 1 includes a device 40 which is used for the synthesis control of the composed image, cooperating with a device 31 for selecting image portions, an anamorphosis means 32 and a visualization device, properly speaking, of the composite image, denoted by reference numeral 50. In FIG. 1, this device 50 is simply illustrated in the form of the screen which will provide the composite image, in order to allow a better comprehension of the present invention.

The video signals which correspond to all desired portions of the image are extracted from an image memorizing device, such as 30, whether it is of the analog or digital type. In this case, this operation is effected using the selector of image portions 31, and under the control of the device 40. For this purpose, the device 40 successively gives orders corresponding to the desired regions of the composite image, and these orders are transmitted on the one hand to the image memorizing device 30, and on the other hand to the visualization device 50, in order to excite the latter so that it operates in the desired region.

Thus, for the first region $R_1$ of the composite image, the device 40 will act on the image memory 30 and on the selector of image portions 31 so that the latter initially selects a portion $P_{11}$ of the electron image $V_1$, then a corresponding portion $P_{12}$, denoted and taken in the image $V_2$, and so on, a portion $P_{1k}$, taken in the image $V_k$, to finally reach the last portion $P_{1n}$, taken in the base image $V_n$. All of these image portions $P_1$, taken successively in the different base images form the first region $R_1$ of the composite image.

The regions such as $R_1$ of the composite image are preferably bands, being horizontal in this case, whereas the portions, such as $P_1$, which form these regions, such as $R_1$, are sections taken respectively in each of the base images. These sections then extend parallel to each other and adjacent to each other, and they even thereby define parallel regions of a general direction.

One skilled in the art will understand that there are many ways of defining the manner in which the sections, such as $P_1$, are preselected from the base images.

One of the simplest methods purely and simply comprises taking a portion in each of the base images, the format of said portion corresponding to the geometry of the region. However, in this case, since each region is composed of n adjacent sections, one of the dimensions of each region will be n times too large with respect to the other. The device 32 then produces an anamorphosis of the portions or sections of image selected by the device 31, in order to re-establish a correct geometry of the image. A method of producing the anamorphosis will be described later on, according to which each of the portions or sections of image are lengthened by a ratio n.

In a variant, the anamorphosis may be produced, on the contrary, by condensing each portion or section of image selected in one of the base images, according to its width, and, for example, by forming the average of n luminous points taken transversely in each of the sections. Of course, numerous other intermediate solutions are possible between these two extreme solutions, by which, for example, it would be possible to lengthen the selected sections in the base images by a ratio smaller than n, and to narrow them in width by the complementary ratio in order to re-establish the normal format which is desired for the composite image.

Up until this point, a detailed description has been given concerning the region $R_1$ of the composite image. The following region $R_2$ is produced in the same manner, by initially taking a section $P_{21}$ of the video image $V_1$, then a section $P_{22}$ of the video image $V_2$, and so on, a section $P_{2k}$ of the image $V_k$, up to the section $P_{2n}$ of the last base image $V_n$. This procedure then continues for all the desired regions.

After the composite image has been completely produced, it is photographed, if the visualization device 50 is a video screen, or it is used just as it is, if this device is of a type directly providing an image on a registration support, and an appropriate lenticular grating is superpositioned on the composite image.

With an image by parallel sections as defined above, the lenticular grating will be a grating of lenses in the form of a sector of a cylinder, the generatrices of which are parallel to the principal direction of the image sections. Thus, it is seen that the configuration of the lenticular grating which is used corresponds to the configuration of the regions or bands as well as to that of the portions or sections appearing in the composite image. The optical characteristics of each of the elementary lenses of the grating are adapted to the arrangement of the image sections in each of the regions, notably with a suitable field angle and focal distance.

In a variant of a lenticular grating of sectors of a cylinder, it would be equally possible to use a lenticular grating formed from a multitude of spheres, or a spherular grating. In a grating of this type, the shape of the regions would reproduce the grid of the lenticular grating. Taking the photograph is slightly more complicated, it being possible for there to be more photographing angles and for them to be established in several directions. The same applies to selecting the image portions.

Returning now to the case in which the lenticular grating is of lenses in the form of a sector of a cylinder, and in which the composite image is composed of long-line parallel sections, it is also possible for these sections to be taken in a direction perpendicular to the scanning of lines used for taking the photograph. However, it is presently considered preferable for these sections to extend in the direction of the lines of photographing. One embodiment of this type will now be described in more detail with reference to FIG. 2.

The electron microscope, illustrated at 11, 1k and 1n is shown in FIG. 2 in three positions among the n successive positions of photographing. The video camera 20 registers each of the images appearing each time on the output screen of the electron microscope, and each of the images obtained is applied to an image numerator 21 to then be registered in a digital image memory 35. Thus, this memory 35 finally comprises the video signals relating to each of the video images $V_1 \ldots V_k \ldots V_n$ which have already been described with reference to FIG. 1.

In the memory 35, each of the points of each of the images may be reached by initially defining an image address, for example from 1 to n, a line address, for example from 1 to 625 and a point address on the line, ranging, for example, from 1 to 400. For the rest of the description, it will be considered that a visualization clock 40 is capable of defining these address signals at a co-ordinated cadence, so that in each image, then in each line, the addresses of points of the line are defined at a frequency F. For each point of the line, the digital image memory comprises, for example, sixteen bits, which is presently estimated as minimal for a good reproduction and corresponds to sixteen grey levels.

Being thus excited by the visualization clock 40, the digital image memory 35 emits image points at frequency F by commencing with the first line of the first image, then the first line of the second image, etc., up to the first line of the image n. The procedure is then continued with the second line of each of the images, and so on up to the 625th line. The video signals thus delivered by the memory 35 are applied to an image visualization member 50 with digital control. This member 50 is selected having an image definition which is clearly greater than that of the video camera 20, so that it is capable of supplying n times 625 lines, and on each line, n times 400 points, in the previously selected Example.

When it addresses the digital memory 35, the visualization clock initially fixes the line address, to successively address each of the images. On the other hand, when it addresses the image visualization member 50, the clock 40 supplies a line + image combined address which is increased each time the image address or the line address increases by one unit. Consequently, the image visualization member 50 will be positioned on the first line when it is a matter of addressing the first line of the first image in the digital memory 35. The member 50 will be positioned on its second line when the first line of the second image is addressed in the memory 35, and so on up to the first line of the image n. The procedure is then continued with the second line of each of the images, to continue up to the exhaustion of all of the lines of all the images. Thus, it is seen that it will be possible in this manner to fill n times 625 lines in the image visualization member 50.

It will now be recalled that the image points exit for each line of the digital memory 35 at the cadence F. On the other hand, the visualization clock 40 supplies the image point addresses in the direction of the image visualization member 50, but this time at a frequency n times F. In this manner, the visualization member 50 will deliver n consecutive points for the same information exiting from the digital image memory 35. This produces the anamorphosis very simply be lengthening the image sections, in this case lines, described above with respect to the device 32 of FIG. 1.

In practice, the object is seen according to angles which are inclined differently on the optical axis. The anamorphosis should also preferably take this into account. If it is admitted that the object covers 625 lines when it is perpendicular to the optical axis, it will cover, for example 624 lines when it is slightly inclined, the 625th line being useless. It is then possible to replace the useless 265th line by a repetition of the 624th line. By denoting the angle of incline of the object on the optical axis as $\alpha$, the change in format of the inclined image is proportional to $1-\cos \alpha$. Each time the variation of $1-\cos \alpha$ corresponds to a scanning line, a line in the image $V_k$ concerned will be repeated to make up for the difference in format of the field observed.

At the end of this procedure, a composite image is obtained on the image visualization member, the image already containing all the information necessary for a relief visualization, having a suitable lenticular grating of sectors of a cylinder.

As previously indicated, the image visualization member 50 may be a cathodic tube or a cathoscope of digital control. Thus, it is possible to use a cathodic tube having a high definition, with or without a memory. It is then necessary to photograph the image which is obtained thus and to subject it to the conventional treatment operations, but with a single sample, and without the problem of recombination to result in the composite image, this being produced from the start. By placing the lenticular grating on the image obtained in this manner, the slight incline of the lines which appears in such a case due to the scanning of the cathodic tube, will naturally be taken into account.

In an advantageous variant of the present invention, an image reproduction member of digital control is used which delivers by itself a permanent image, for example the peripheral sold under the name of VISOR by Soror électrooptique or similar apparatus manufactured by Bell & Howell. Devices of this type are presently used in connection with computers in order to obtain negatives of variable density. As before, it will then suffice to apply onto the image thus obtained a lenticular grating of sectors of a cylinder, of appropriate characteristics.

It is seen that the device of FIG. 2 operates under the control of the visualization clock 40 to complete the following stages:

(1) to define a line number L initially equal to 1,
(2) to seek in the memory 35 the range line L of the base image of angle $A_1$, or the first base image $V_1$,
(3) to excite the first line of the image visualization member 50 according to each point of the line L of the base image of angle $A_1$, repeated consecutively n times,
(4) to selectively repeat the operations (2) and (3) for the line L of the other base images in the order of the angles, and
(5) to repeat the operations (2) to (4) after each time having increased the line number L, up to exhaustion of the lines.

In the embodiment of FIG. 2, each section which is used in the composite image is defined by a single line selected just as it is in one of the base images, with an anamorphosis of ratio n over the length thereof. In a variant, it is of course possible to form each section of the composite image from several adjacent lines of the base image, if the definition which is finally desired allows it. If the procedure is carried out so far as to use each section of the composite image n with consecutive lines of one of the base images, the anamorphosis produced by lengthening by the ratio n may then be replaced by an anamorphosis consisting purely and simply of producing a single image point, and of forming the average of the n points meeting transversely on the n adjacent lines selected in each base image.

As previously indicated, variants of anamorphosis may be envisaged by acting differently on the lengthening of the lines and on the number of selected lines.

Of course, if the shape of the image points of the visualization member 50 differs from that used when taking the photograph, this will be taken into account in the production of this anamorphosis.

At present, one of the preferred uses of the present invention relates to the electron microscope. In certain electron microscopes, so-called scanning electron microscopes, the main electron beam is subjected to a television-type scanning, and a detector receives the radiation (generally electrons or X-rays) emanating from different points in the object which are scanned successively. The signal which issues from the detector is directly supplied as a luminance control to a cathodic visualization tube, the scanning of which is synchronous with that of the beam of electrons on the object. The screen of the cathodic tube would then play the role of the screen E which has already been mentioned, but the device is simplified very advantageously by directly memorizing, with numbering, the signals which have issued from the detector.

In this use, the present invention allows a quasi-complete omission of the photographic operations, and thereby even allows a considerable gain in time, economy in the costs due to the photographic products (sensitive surface and chemical products), and also allows the possibility of working practically in real time.

Of course, the present invention is not restricted to the embodiments or to the use described and it extends to all variants which conform to the spirit thereof.

What we claim is:

1. A method of three dimensional visualization of an object, including the following steps:
    (a) producing a number (n) of sets of video signals (Sk; k varying from 1 to n) respectively corresponding to a number (n) of base images (Vk) of the object taken with the same field, but at different photographing angles (Ak) corresponding to relative turning of the object around a common axis passing through the object and perpendicular to the optical axis of observation;
    (b) registering said sets of video signals (Sk),
    (c) dividing each of the base images (Vk) of the object in a plurality of adjacent elementary portions (P) corresponding to adjacent bands parallel to a common general direction,
    (d) selecting in each set of video signals the video signals corresponding to, respectively, said portions,
    (e) forming a composite image divided into a plurality of adjacent regions, said adjacent regions having the same configuration as that of said portions and said composite image having a number of adjacent regions which equals the number of said portions of each base image so that the portions of each base image are respectively associated with the regions of the composite image, each of said regions being composed of a number (n) of associated portions respectively defined from the selected video signals of each set of video signals, by arranging for each region of the composite image the selected video signals corresponding to the associated portions in an order corresponding to the respective photographing angles (ak), said step of forming a composite image being operated simultaneously with the step of
    (f) changing the magnification of said adjacent elementary portions between the general direction of said adjacent elementary portions (P) and the direction which is perpendicular thereto, in a ratio equal to said number (n)
    (g) positioning in optical cooperation with the composite image thus formed a lenticular grating comprising elementary lenses, in which the grid of the lenticular grating reproduces and corresponds to the shape of said regions.

2. The method of claim 1, wherein during operation (b) the video signals are registered in digital form.

3. The method of claim 2 wherein during step (c) the common general direction is parallel to said common axis and during step (g) the lenticular grating is a grating of lenses in the form of sectors of cylinder, the generatrices of which are also parallel to the common general direction.

4. The method of claim 3 wherein the video signals are defined for a scanning line parallel to the common axis, each image portion comprising one or more lines of the respective one of the base images.

5. The method of claim 1 wherein steps (e) and (f) comprise:
(e1) defining a line number (L) initially equal to 1,
(e2) seeking in a memory the range line (L) of the base image of a first angle ($A_1$),
(f1) exciting a line of an image display according to each point of the line (L) of the base image of the first angle ($A_1$), repeated consecutively the said number (n) times,
(e3) selectively repeating the operations (e2) and (f1) for the range line (L) of the other base images in the order of the angles, and
(e4) repeating the operations (e2) to (e3) after each time having increased the line number (L), up to exhaustion of the lines.

6. The method of claim 5, wherein the video signals relating to the base images are numbered with at least 16 grey levels.

7. The method of claim 6, wherein the video signals relating to the base images are numbered with from 32 to 128 grey levels.

8. The method of claim 5, wherein operation (a) comprises taking the said number (n) of base images ($V_k$) of the object with a video camera at different angles ($A_k$).

9. The method of claim 8, wherein the said number (n) of video base images of the object are views in an electron microscope, for which views the object is successively positioned at different angles ($A_k$).

10. The method of claim 5, wherein the said number (n) of the base image is equal to at least 4, and the number of regions of the composite image is of the order of several hundred.

11. The method of claim 10, wherein the said number (n) of the base images is equal to at least 8.

12. A method of three dimensional visualization of an object, including the following steps:
(a1) producing a number (n) of sets of video signals (Sk; k varying from 1 to n) respectively corresponding to a number (n) of base images (Vk) of the object taken with the same field, but at different photographing angles (Ak) corresponding to relative turning of the object around a common axis passing through the object and perpendicular to the optical axis of observation;
(a2) repeating the operation (a1) a number (p) of times with different photographing angles corresponding to relative turning of the object around a second common axis perpendicular to said first common axis and to said optical axis,
(b) registering said sets of video signals (Sk),
(c) forming a bidimensional division of each base images (Vl) of the object in a grid of a plurality of adjacent elementary portions (P), said division of the grid being operated parallel to two common general directions respectively parallel to said first and second common axis,
(d) selecting in each set of video signals the video signals corresponding to respective said portions,
(e) forming a composite image divided into a plurality of adjacent regions, said adjacent regions having the same configuration as that of said portions and said composite image having a number of adjacent regions which equals the number of said portions of each base image so that the portions of each base image are respectively associated with the regions of the composite image, each of said regions being composed of a grid of np associated portions respectively defined from the selected video signals of each set of video signals, by arranging for each region of the composite image the selected video signals corresponding to the associated portions, in an order corresponding to the respective photographing angles (Ak), said step of forming a composite image being operated simultaneously with the step
(f) changing the magnification of said adjacent elementary portions in a ratio equal to said number (n) on said number (p) between the first general direction of said adjacent elementary portions (P) and the second general direction perpendicular thereto,
(g) positioning in optical cooperation with the composite image thus formed a lenticular grating comprising elementary lenses, in which the grid of the lenticular grating reproduces and corresponds to the shape of said regions.

13. The method of claim 12 wherein during step (g) the lenticular grating is a spherular grating of lenses.

14. The method of claim 12 wherein during step (g) the lenticular grating is a grating of lenses in the form of sectors of cylinders the generatrices of which are also parallel to the first general direction.

15. A device for three dimensional visualization of an object, including:
(a) means for producing a number (n) of sets of video signals (Sk; k varying from 1 to n) respectively corresponding to a number (n) of base images (Vk) of the objects taken with the same field, but at different photographing angles (Ak) corresponding to relative turning of the object around a common axis passing through the object and perpendicular to the optical axis of observation,
(b) means for registering said sets of video signals (Sk),
(c) means for dividing each base images (Vk) of the object in a plurality of adjacent elementary portions (P) corresponding to adjacent bands parallel to a common general direction,
(d) means for selecting in each set of video signals the video signals corresponding to, respectively, said portions,
(e) means for forming a composite image divided into a plurality of adjacent regions, said adjacent regions having the same configuration as that of said portions and said composite image having a number of adjacent regions which equal the number of said portions of each base image so that the portions of each base image are respectively associated with the regions of the composite image, each of said regions being composed of a number (n) of associated portions respectively defined from the selected video signals of each set of video signals, by arranging for each region of the composite image the selected video signals corresponding to the associated portions in an order corresponding to the respective photographing angles (Ak), (f) means for changing the magnification of said adjacent elementary portions between the general direction of said adjacent elementary portions (P) and the direction which is perpendicular thereto, in a ratio equal to said number (n), (g) a lenticular grating comprising elementary lenses and having a grid which reproduces and corresponds to the shape of said regions said lenticular grating being positioned in optical cooperation with the composite image.

16. A device for three dimensional visualization of an object, including:

(a1) means for producing a number (n) of sets of video signals (Sk): k varying from 1 to n) respectively corresponding to a number (n) of base images (Vk) of the object taken with the same field, but at different photographing angles (Ak) of the object taken with the same field, but at different photographing angles (Ak) corresponding to relative turning of the object around a first common axis passing through the object and perpendicular to the optical axis of observation, (a2) means for repeating the operation (a1) a number (p) of times with different photographing angles corresponding to relative turning of the object around a second common axis perpendicular to said first common axis and to said optical axis, (b) means for registering said sets of video signals (Sk), (c) means for forming a bidimensional division of each base images (Vk) of the object in a grid of a plurality of adjacent elementary portions (P), said division of the grid being operated parallel to two common general directions respectively parallel to said first and second common axis, (d) means for selecting in each set of video signals the video signals corresponding to, respectively, said portions, (e) means for forming a composite image divided into a plurality of adjacent regions, said adjacent regions having the same configurations as that of said portions of each base image and said composite image having a number of regions which equals the number of said portions of each base image so that the portions of each base image are respectively associated with the regions of the composite image, each of said regions being composed of a grid of np associated portions respectively defined from the selected video signals of each set of video signals, by arranging for each region of the composite image the selected video signals corresponding to the associated portions, in an order corresponding to the respective photographing angles (Ak), (f) means for changing the magnification of said adjacent elementary portions in a ratio equal to said number (n) on said number (p) between the first general direction of said adjacent elementary portions (P) and the second general direction perpendicular thereto, (g) means for positioning in optical cooperation with the composite image thus formed a lenticular grating comprising elementary lenses, the grid of the lenticular grating reproducing and corresponding to the shape of said regions.

17. The device of claim 16, wherein the lenticular grating is a spherular grating of lenses.

* * * * *

UNITED STATES PATENT AND TRADEMARK OFFICE
CERTIFICATE OF CORRECTION

PATENT NO. : 4,506,296
DATED : March 19, 1985
INVENTOR(S) : ALAIN R. P. MARRAUD and MAURICE G. Q. BONNET It is certified that error appears in the above-identified patent and that said Letters Patent is hereby corrected as shown below:

Claim 12, column 10, line 17, after "step" insert -- of --.

Signed and Sealed this

Sixth Day of August 1985

[SEAL]

Attest:

DONALD J. QUIGG

Attesting Officer     Acting Commissioner of Patents and Trademarks